US012559160B2

(12) United States Patent
Lee et al.

(10) Patent No.: US 12,559,160 B2
(45) Date of Patent: Feb. 24, 2026

(54) DEVICE AND METHOD OF CONTROLLING ELECTRIC POWER STEERING SYSTEM, AND ELECTRIC POWER STEERING SYSTEM INCLUDING THE SAME

(71) Applicant: HL MANDO CORPORATION, Gyeonggi-do (KR)

(72) Inventors: Sumin Lee, Gyeonggi-do (KR); Kyuyeong Je, Gyeonggi-do (KR)

(73) Assignee: HL MANDO CORPORATION, Gyeonngi-do (KR)

( * ) Notice: Subject to any disclaimer, the term of this patent is extended or adjusted under 35 U.S.C. 154(b) by 85 days.

(21) Appl. No.: 18/379,168

(22) Filed: Oct. 12, 2023

(65) Prior Publication Data

US 2024/0367713 A1    Nov. 7, 2024

(30) Foreign Application Priority Data

May 4, 2023    (KR) ........................ 10-2023-0058470

(51) Int. Cl.
*B62D 5/00*        (2006.01)
*B62D 5/04*        (2006.01)
*H02P 27/06*       (2006.01)

(52) U.S. Cl.
CPC .............. *B62D 5/003* (2013.01); *B62D 5/04* (2013.01); *B62D 5/046* (2013.01); *B62D 5/0475* (2013.01); *B62D 5/0481* (2013.01); *B62D 5/0484* (2013.01); *H02P 27/06* (2013.01)

(58) Field of Classification Search
None
See application file for complete search history.

(56) References Cited

U.S. PATENT DOCUMENTS

| | | | | |
|---|---|---|---|---|
| 9,634,587 | B2 * | 4/2017 | Kikuchi ................. | H02P 6/085 |
| 9,889,880 | B2 * | 2/2018 | Mori ........................ | B60L 3/12 |
| 10,862,418 | B2 * | 12/2020 | Ghaderi ................. | H02P 27/08 |
| 11,370,373 | B2 * | 6/2022 | Kabune ................. | H02M 7/003 |
| 11,489,480 | B2 * | 11/2022 | Lee ........................ | H02P 29/028 |
| 11,904,960 | B2 * | 2/2024 | Lee ........................ | B62D 1/187 |
| 12,009,766 | B2 * | 6/2024 | Maruhashi .............. | H02P 29/68 |
| 12,084,127 | B2 * | 9/2024 | Lee ........................ | B62D 1/181 |
| 12,091,101 | B2 * | 9/2024 | Nakakuki .............. | H02K 7/108 |
| 12,122,464 | B2 * | 10/2024 | Beres ..................... | B62D 5/049 |

(Continued)

FOREIGN PATENT DOCUMENTS

| | | | | |
|---|---|---|---|---|
| CN | 118894147 A | * 11/2024 | .............. | B62D 5/04 |
| DE | 102020207267 A1 | * 12/2020 | .............. | H02P 27/06 |

(Continued)

*Primary Examiner* — Kevin R Steckbauer

(74) *Attorney, Agent, or Firm* — WOMBLE BOND DICKINSON (US) LLP

(57)            ABSTRACT

A control device for an electric power steering (EPS) system may include a first steering controller including a first inverter, a first locking circuit connected to the first inverter, and a first gate driver controlling driving of the first inverter, and a second steering controller including a second inverter, a second locking circuit connected to the second inverter, and a second gate driver controlling driving of the second inverter. If the first steering controller operates normally, the first steering controller may transmit a second lock disable signal for inactivating the second locking circuit, included in the first steering controller, to the second steering controller.

25 Claims, 12 Drawing Sheets

(56)                    References Cited

U.S. PATENT DOCUMENTS

| | | | | |
|---|---|---|---|---|
| 12,126,163 | B2 * | 10/2024 | Clark | H02H 7/1213 |
| 12,145,666 | B2 * | 11/2024 | Lee | H02P 29/028 |
| 12,187,362 | B2 * | 1/2025 | Sun | B62D 5/0484 |
| 2010/0152940 | A1 * | 6/2010 | Mitsutani | B60W 10/08 |
| | | | | 180/65.23 |
| 2016/0134212 | A1 * | 5/2016 | Kikuchi | H02P 27/06 |
| | | | | 318/400.21 |
| 2016/0325777 | A1 * | 11/2016 | Mori | H02P 6/085 |
| 2020/0317258 | A1 * | 10/2020 | Nakamura | H02P 25/22 |
| 2020/0353974 | A1 * | 11/2020 | Nakamura | B62D 15/025 |
| 2020/0353975 | A1 * | 11/2020 | Nakamura | H02P 29/028 |
| 2020/0391681 | A1 * | 12/2020 | Kabune | H02M 7/53871 |
| 2021/0046974 | A1 * | 2/2021 | Ootake | H02P 29/028 |
| 2021/0316782 | A1 * | 10/2021 | Lee | B62D 1/181 |
| 2021/0384862 | A1 * | 12/2021 | Lee | B62D 5/0484 |
| 2023/0059965 | A1 * | 2/2023 | Nakakuki | H02K 11/215 |
| 2023/0068424 | A1 * | 3/2023 | Sun | B62D 5/0469 |
| 2023/0117130 | A1 * | 4/2023 | Chao | H03K 17/08104 |
| | | | | 318/3 |
| 2024/0083495 | A1 * | 3/2024 | Lee | B62D 1/181 |
| 2024/0367713 | A1 * | 11/2024 | Lee | B62D 5/04 |

FOREIGN PATENT DOCUMENTS

| | | | | | |
|---|---|---|---|---|---|
| DE | 102023131107 | A1 | * | 11/2024 | B62D 5/04 |
| EP | 3012966 | A1 | * | 4/2016 | H02M 7/53871 |
| EP | 3118990 | A1 | * | 1/2017 | H02H 7/0833 |
| EP | 3012966 | B1 | * | 6/2020 | H02P 29/032 |
| JP | 2015109775 | A | * | 6/2015 | |
| JP | 6747412 | B2 | * | 8/2020 | |
| JP | 6747413 | B2 | * | 8/2020 | |
| JP | 7156211 | B2 | * | 10/2022 | |
| JP | 7192625 | B2 | * | 12/2022 | B62D 5/0487 |
| JP | 7380412 | B2 | * | 11/2023 | B62D 6/00 |
| JP | 2024062085 | A | * | 5/2024 | |
| KR | 20220102948 | A | * | 7/2022 | B62D 5/0493 |
| KR | 20240161393 | A | * | 11/2024 | B62D 5/04 |
| WO | WO-2014203300 | A1 | * | 12/2014 | H02P 27/06 |
| WO | WO-2019017302 | A1 | * | 1/2019 | H02K 11/33 |
| WO | WO-2019044106 | A1 | * | 3/2019 | H02P 27/06 |
| WO | WO-2023281990 | A1 | * | 1/2023 | B62D 5/0493 |

* cited by examiner

DEVICE AND METHOD OF CONTROLLING ELECTRIC POWER STEERING SYSTEM, AND ELECTRIC POWER STEERING SYSTEM INCLUDING THE SAME

CROSS REFERENCE TO RELATED APPLICATION

This application claims priority from Korean Patent Application No. 10-2023-0058470, filed on May 4, 2023, which is hereby incorporated by reference for all purposes as if fully set forth herein.

TECHNICAL FIELD

Some embodiments of the present disclosure generally relate to a device and a method of controlling an electric power steering (EPS) system, and an electric power steering system including the same. More specifically, certain embodiments of the present disclosure relate to a control device and method capable of selectively inactivating a locking of a motor in a steer-by-wire (SBW) type EPS system having a redundant control system, and an EPS system including the same.

BACKGROUND

A steering device or a steering system is used as a device for controlling the travelling direction of a vehicle. Recently, electric power steering (EPS) systems in which a steering motor provides necessary steering force by electronic control are widely utilized.

The EPS system or a EPS device may operate to rotate a steering shaft of a steering column or move a rack bar connected to the steering column by driving a steering motor according to a steering torque applied to a steering wheel by a driver.

As an example of such an EPS system, there is a steer-by-wire (SBW) steering system that is an EPS system of an SBW type.

The SBW steering system may include a structure that removes a mechanical coupling device such as a steering column, a universal joint, or a pinion shaft between a steering wheel and a vehicle wheel.

The SBW steering system may generally include an upper device and a lower device mechanically separated from each other, and a control circuit for controlling the upper device and the lower device.

In the case of the SBW steering system, since the upper device connected to a steering wheel and the lower device connected to a rack bar are mechanically separated, even if a reaction force motor or a steering motor is turned off due to a vehicle ignition off or a failure of a steering control circuit, a steering wheel coupled with the reaction force motor may rotate or a wheel coupled with the steering motor may be steered.

That is, even if the reaction force motor of the upper device is turned off due to the vehicle ignition off or the failure of the steering control circuit, the steering wheel may rotate arbitrarily since the steering wheel and steering column are separated from the lower device.

In addition, even if the steering motor of the lower device is turned off due to the vehicle ignition off or the failure of the steering control circuit, the rack bar linked to the steering motor may move left and right, and thus the wheels may be arbitrarily steered. In the present disclosure, the steering motor may refer to a driving motor which directly acts on a steering column or rack bar to steer a vehicle wheel.

SUMMARY

In this background, some embodiments of the present disclosure are to provide a device and method of controlling an EPS system capable of preventing steering control from being restricted by motor restraint under a specific condition in a redundant electric steering system of a vehicle, and an electric power steering system including the same.

Certain embodiments of the present disclosure are to provide a device and method of controlling an EPS system capable of continuously controlling steering by suppressing motor restraint if an abnormality or a failure occurs in one steering control circuit in a redundant SBW steering system including a first steering control circuit and a second steering control circuit, and an electric power steering system including the same.

Various embodiments of the present disclosure are to provide a device and method of controlling an EPS system, in a redundant SBW steering system including a first steering control circuit and a second steering control circuit, capable of inactivating the motor lock function of a first steering control circuit by a second steering control circuit operating normally in the case that an abnormality or a failure occurs in the first steering control circuit, and an electric power steering system including the same.

Some embodiments of the present disclosure is to provide a device and method of controlling an EPS system capable of preventing rapid steering of the steering wheel and normally performing steering control by preventing the locking of the reaction force motor or the steering driving motor even if a failure or abnormality occurs in one steering control circuit in the redundant SBW steering system, and an electric power steering system including the same.

In accordance with an aspect of the present disclosure, there may be provided a control device of an electric power steering system including a first steering controller including a first inverter, a first locking circuit connected to the first inverter, and a first gate driver controlling driving of the first inverter, and a second steering controller including a second inverter, a second locking circuit connected to the second inverter, and a second gate driver controlling driving of the second inverter, wherein, if the first steering controller operates normally, the first steering controller is configured to transmit a second lock disable signal for inactivating the second locking circuit to the second steering controller.

The second locking circuit included in the second steering controller may include a second-1 switching device connected to an output node of the second inverter and a second-2 switching device for turning on/off the second-1 switching device, wherein the second lock disable signal may be supplied to a second gate node of the second-2 switching device.

Specifically, the second-1 switching device may include a first gate node connected to a high potential voltage, a first source node connected to the output node of the second inverter, and a first drain node grounded.

In this case, the second-2 switching device may include a second source node connected to a first node between the high potential voltage and the first gate node of the second-1 switching device, a second drain node grounded, and the second gate node to which the second lock disable signal is applied.

In addition, a steering control device according to an embodiment may further include a voltage regulation switch disposed in a transmission path of the second lock disable signal.

The voltage regulation switch may output a battery level voltage in response to a high level second lock disable signal.

In addition, a steering control device according to an embodiment may further include an isolator disposed in a transmission path of the second lock disable signal.

The isolator may be an opto-coupler including an optical transmission element which emits light in response to the second lock disable signal, and an optical receiver which is turned on by a light emission of the optical transmission element and outputs a signal corresponding to the second lock disable signal.

The first steering controller may further include a first micro control unit (MCU) which generates a first gate driver enable signal for activating the first gate driver and supplies the first gate driver enable signal to the first gate driver.

In this case, the first MCU may supply the first gate driver enable signal to the first gate driver and simultaneously transmit the second lock disable signal to the second steering controller.

The second lock disable signal may be the same as the first gate driver enable signal.

In addition, each of the first inverter and the second inverter may include an H-bridge circuit for supplying u-phase driving current, v-phase driving current, and w-phase driving current to a three-phase motor. The second locking device may include a second u-phase locking circuit connected to an u-phase driving current output terminal of the second inverter, a second v-phase locking circuit connected to a v-phase driving current output terminal of the second inverter, and a second w-phase locking circuit connected to a w-phase driving current output terminal of the second inverter.

In this case, the second lock disable signal may be supplied to all of the second u-phase locking circuit, the second v-phase locking circuit, and the second w-phase locking circuit.

In addition, by using the second lock disable signal, the u-phase driving current output terminal, the v-phase driving current output terminal, and the w-phase driving current output terminal may have different potentials, respectively, so that the second inverter may operate normally.

In accordance with an aspect of the present disclosure, there may be provided a control method of an electric power steering system, which includes a first steering controller including a first inverter, a first locking circuit connected to the first inverter, and a first gate driver controlling driving of the first inverter, and a second steering controller including a second inverter, a second locking circuit connected to the second inverter, and a second gate driver controlling driving of the second inverter. The control method may include monitoring, by the first steering controller, an operating state of the first steering controller, generating, by the first steering controller, if the first steering controller operates normally, a second lock disable signal for inactivating the second locking circuit and transmitting the second lock disable signal to the second steering controller, and deactivating the second locking circuit based on the second lock disable signal.

In accordance with an aspect of the present disclosure, there may be provided an electric power steering system including an upper device including a steering wheel and a reaction force motor interlocked with the steering wheel, a lower device which is mechanically separated from the upper device and includes a steering driving motor interlocked with a wheel of a vehicle, a first steering controller including a first inverter supplying driving current to the reaction force motor or the steering driving motor, a first locking circuit connected to the first inverter, and a first gate driver controlling driving of the first inverter, and a second steering controller including a second inverter supplying driving current to the reaction force motor or the steering driving motor, a second locking circuit connected to the second inverter, and a second gate driver controlling driving of the second inverter. In this case, if the first steering controller operates normally, the first steering controller may transmit a second lock disable signal for inactivating the second locking circuit to the second steering controller.

According to an embodiment of the present disclosure, it is possible to prevent steering control from being restricted by motor restraint under a specific condition in a redundant vehicle electric steering system.

In addition, in a redundant SBW steering system including a first steering controller and a second steering controller, it is possible to continuously perform the steering control by suppressing the locking of a motor if an abnormality or failure occurs in one steering control.

In addition, in a redundant SBW steering system including a first steering controller and a second steering controller, the normally operating first steering controller may deactivate the motor locking function of the second steering controller even if an abnormality or fault occurs in the second steering controller.

Therefore, in the case that an abnormality or fault occurs in one steering controller in the redundant SBW steering system, it is possible to suppress the locking of a reaction force motor or a steering driving motor, thereby preventing a sudden steering of a steering wheel and performing a normal steering control.

DETAILED DESCRIPTION

Figure 1:
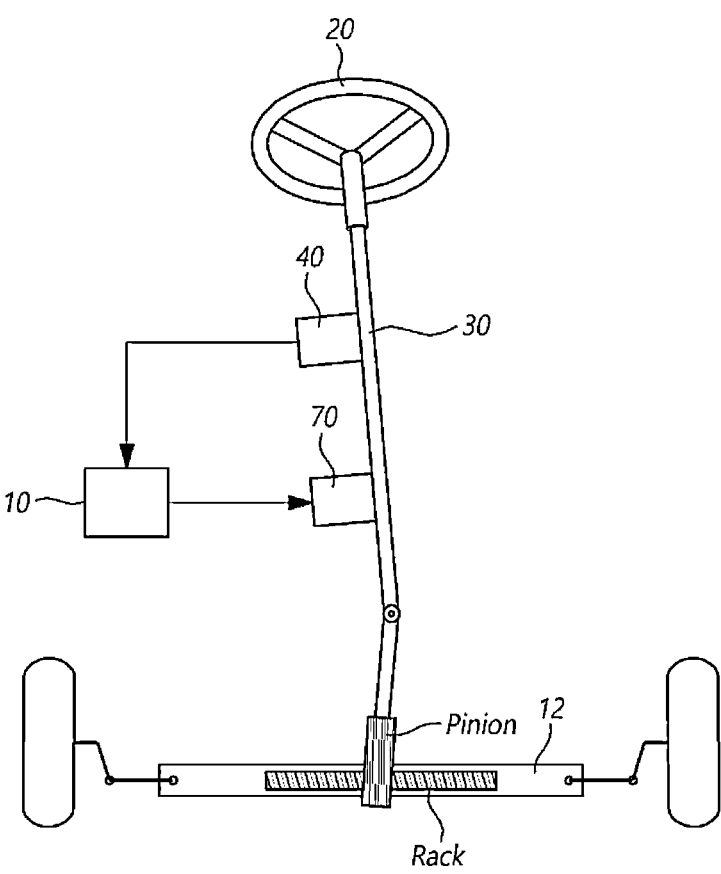
FIG. 1 illustrates an example of a schematic configuration of an electric power steering system.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 illustrates an example of a schematic configuration of an electric power steering system.

A steering device or steering system may be used as a device for controlling the driving or traveling direction of a vehicle, and recently, there is widely used an electric power steering (EPS) system in which a steering motor provides necessary steering force by electronic control.

The EPS system or EPS device may operate to rotate a steering column or move a rack bar by driving an EPS steering motor according to a steering torque applied to a steering wheel by a driver.

An EPS system in which a steering motor rotates a steering column may be a column-type EPS system or a C-type EPS system. In the C-type EPS system, the steering column may be connected with a universal joint and a pinion gear, and the pinion gear may be coupled with a rack gear of a rack bar connected to one or more wheels of a vehicle.

FIG. 1 illustrates a C-type EPS system, and the C-type EPS system may include a steering column 30 connected to a steering wheel 20, a sensor unit 40 installed on the steering column 30, a steering motor 70 configured to rotate the steering column 30, and an electronic control unit (ECU) 10, which may be, for example, but not limited to, a steering controller or steering control circuit for controlling the steering motor 70. A reducer may be connected to the steering motor 70, and the reducer may be interlocked between the steering column 30 and the steering motor 70.

The steering column 30 may be coupled to the steering wheel 20 and may be rotatable together with the steering wheel 20. The shape of the steering column 30 may be, for example, but not limited to, substantially cylindrical or bar.

The steering column 30 may be interlocked with one or more reducers, and one of the plurality of reducers may be coupled to an outer circumferential surface of the steering column 30.

The sensor unit 40 may include one or more sensors such as a steering angle sensor, a torque sensor, and a vehicle speed sensor.

The steering angle sensor may detect a steering angle or speed generated or caused by the rotation of the steering wheel 20. In addition, the steering angle sensor 40 may output a steering angle signal indicating information on the steering angle or speed.

The torque sensor may detect steering torque generated or caused by the rotation of the steering wheel 20. In addition, in response to the detection of the steering torque, the torque sensor may output a steering torque signal indicating information on the steering torque.

Here, the steering torque may mean rotational torque acting on a torsion bar between an input shaft and an output shaft of the steering column 30. Therefore, the steering torque may be detected even if the steering wheel 20 is not rotating.

The vehicle speed sensor may detect a speed of the vehicle and output a vehicle speed signal indicating information on the vehicle speed.

The steering controller or ECU 10 may receive steering information associated with steering from the sensor unit 40, calculate a target rack position for providing a steering assist force based on the steering information, and output a command current corresponding to the rack position to the steering motor 70. For example, the steering information may include one or more of the steering angle signal output by the steering angle sensor, the steering torque signal output by a torque sensor, and the vehicle speed signal output by a speed sensor.

The ECU 10 may be implemented with hardware and software including one or more of a micro controller unit (MCU), one or more inverters, a printed circuit board (PCB), and the like.

The steering motor 70 may receive the command current from the ECU 10 and be driven at torque and rotational speed according to the command current. The steering motor 70 may be coupled with a reducer disposed on the steering column 30. The rotation of the steering motor 70 may cause to rotate the reducer interlocked with the steering column 30 and the steering column 30.

Meanwhile, the steering column 30 may be rotated by the rotation of the steering motor 70, and accordingly, the rack bar 12 linked to the pinion gear at the output end of the steering column 30 may move left and right.

Accordingly, the vehicle may be steered by moving wheels connected to both ends of the rack bar 12 to the left or right according to the movement of the rack bar 12.

The steering motor 70 included in the C-type EPS system may be a three-phase motor, but not limited thereto.

The ECU 10 may perform a function of receiving power from a power supply unit, generating a target current to be supplied to each winding of the steering motor 70 using an inverter, and supplying the target current to the steering motor 70.

In the C-type EPS system, when the steering motor 70 rotates the steering column 30 to apply or provide steering assist force, the steering assist force may be transmitted to the rack bar 12 through the pinion-rack gear. As the rack bar 12 moves left and right, the wheels connected to the rack bar 12 may be steered left and right.

Meanwhile, an EPS system in which a steering motor directly moves a rack bar connected to one or more wheels may be a rack-type EPS system or an R-type EPS system.

In the R-type EPS system, the steering motor and the rack bar may be connected by a belt or gear, and a reducer such as a ball nut is linked between the steering motor and the rack bar. As the steering motor rotates, the ball nut reducer linked to the rack bar rotates, and the rack bar may move left and right according to the rotation of the reducer to steer the wheels.

Figure 2:
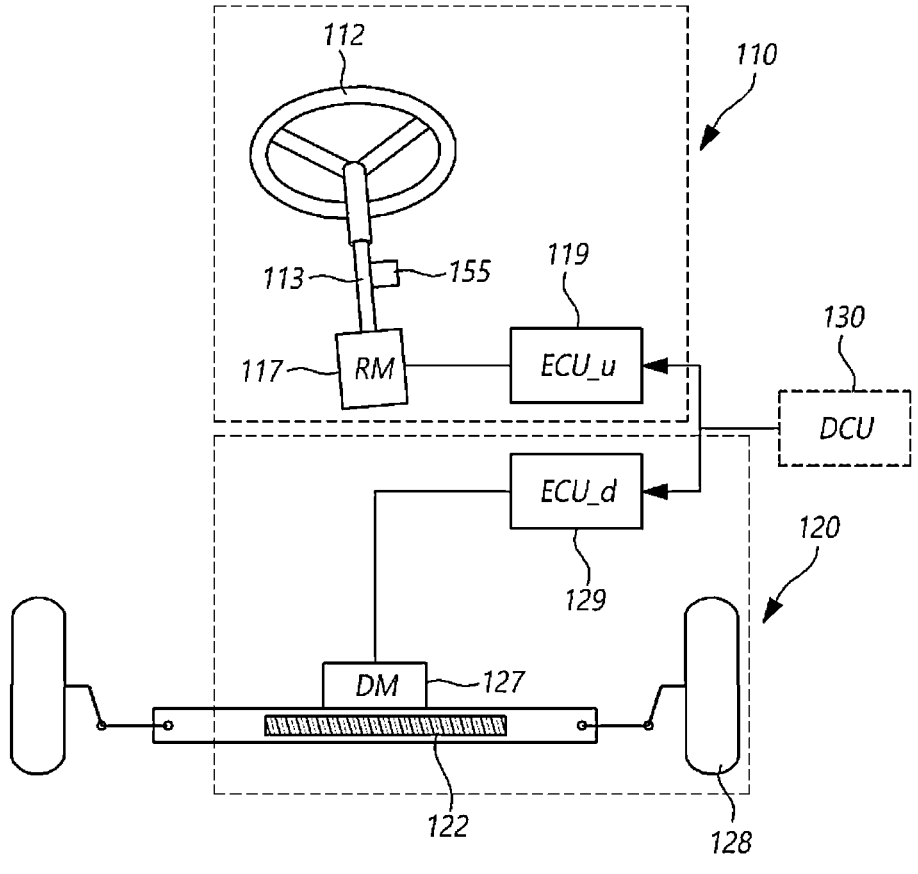
FIG. 2 illustrates a schematic configuration of a SBW steering system according to an embodiment of the present disclosure.

FIG. 2 illustrates a schematic configuration of a steer-by-wire (SBW) type steering system according to an embodiment of the present disclosure.

As an example, the EPS system may be implemented as a steer-by-wire (SBW) type.

The SBW type steering system may include a structure in which the mechanical coupling devices such as a steering column, a universal joint, or a pinion shaft between a steering wheel and a wheel are removed. In other words, SBW type steering system has no mechanical link connecting between a steering wheel 112 and vehicle wheels 128.

Referring to FIG. 2, the SBW type steering system to which an embodiment of the present disclosure can be applied may include an upper device 110 and a lower device 120 that are mechanically separated from each other, and a control device 130 configured to control the upper device 110 and a lower device 120.

The upper device 110 may include the steering wheel 112, a steering column 113 connected to the steering wheel 112, a torque sensor 155 configured to detect a torque applied to the steering wheel 112, a reaction force motor (RM) 117 which may be a motor device configured to provide reaction force torque to the steering wheel 112 according to steering through a lower rack bar 122, and an upper ECU (ECU_u) 119 configured to control the reaction force motor 117. This upper device 110 may be referred as a steering feedback actuator (SFA).

The lower device 120 may include a rack bar 122 connected to one or more wheels 128 of the vehicle, a steering driving motor (DM) 127 configured to move the rack bar 122 left and right, and a lower ECU (ECU_d) 129 configured to control the steering driving motor 127.

The lower ECU 129 of the lower device 120 may generate a steering assist torque signal proportional to the steering torque applied to the steering wheel 112, and generate a driving signal for moving the rack bar 122 connected to a tie rod of the wheel 128 to the left and right by using the steering assist torque signal.

The lower device 120 may control the steering driving motor 127 through a gear and/or belt mechanism such as a ball nut reducer based on the driving signal. The lower device 120 may be referred as a road wheel actuator (RWA).

That is, in the SBW steering system, the upper device 110 including the steering wheel 112, the steering column 113 and the reaction force motor 117 and the lower device 120 including a rack bar driving device (e.g., a pinion gear, a ball nut and the steering driving motor 127) may operate independently without intermediate mechanical connection between the upper device 110 and the lower device 120.

Therefore, in order to provide a driver with steering feeling, it is required to rotate the steering wheel 112 connected to the upper device 110 according to the movement of the rack bar 122 of the lower device 120 where actual steering of the wheel 128 is performed. In this case, the force or torque applied to the steering wheel 112 may be defined as reaction force or reaction force torque.

Meanwhile, the steering system is required not to operate when the engine of the vehicle is turned off or in the case of the vehicle ignition off.

That is, if the steering wheel 112 is rotated in a state in which the vehicle engine is turned off to rotate the wheels 128, the wheels 128 of a stopped or parked vehicle may be arbitrarily steered.

Therefore, the steering wheel 112 is required to be locked when the engine of the vehicle is turned off or in the case of the vehicle ignition off.

Meanwhile, in the C-type EPS system or R-type EPS system, even if the steering motor is turned off due to the vehicle ignition off or an ECU failure, the steering wheel may be automatically locked since the mechanical structures such as a steering column, a rack bar, and a reducer are interlocked between the steering wheel and the wheel.

However, in the SBW type steering system, the upper device 110 connected to the steering wheel 112 and the lower device 120 connected to the rack bar 122 are mechanically separated. Therefore, even if the reaction force motor or steering motor is turned off due to the vehicle ignition off or an ECU failure, the steering wheel 112 linked to the upper device 110 may rotate or the vehicle wheel 128 linked to the lower device 120 may be steered.

That is, even if the reaction force motor 117 of the upper device 110 is turned off due to the vehicle ignition off or a failure of the upper ECU 119, since the steering wheel 112 and steering column 113 are mechanically separated from the lower device 120, the steering wheel 112 may rotate arbitrarily.

In addition, even if the steering motor 127 of the lower device 120 is turned off due to the vehicle ignition off or a failure of the lower ECU 129, the rack bar 122 linked to the steering motor 127 can move left and right, so that the vehicle wheels 128 may be arbitrarily steered.

That is, unlike the C-type EPS system or R-type EPS system, the SBW steering system may require a locking function that restricts the rotation of the steering wheel 112 or the movement of the rack bar 122 in the case of the vehicle ignition off or an ECU failure.

Accordingly, the SBW type steering system requires to have a locking device configured to forcibly lock the reaction force motor 117 or the steering motor 127 in the case of the vehicle ignition off or an ECU failure.

As an example of such a locking device, a separate clutch device may be provided to mechanically connect the upper device 110 and the lower device 120.

As another example of the locking device, a key lock solenoid device can lock the steering column 113 in the case of the vehicle ignition off or an ECU failure.

As still another example of a locking device, there may be provided a manner in which the power is supplied to the steering system regardless of the vehicle ignition off or ECU failure, and the steering system is activated only if there is an occupant by detecting a vehicle occupant.

Alternatively, the locking device may be implemented as a locking circuit composed of a kind of circuit.

In general, a motor used in a steering system may be a multi-phase motor such as a three-phase motor including u-phase coils, v-phase coils, and w-phase coils.

In the case of such a three-phase motor, if an input terminal of each phase coil is floating, the three-phase motor may rotate arbitrarily.

Therefore, in the case of the vehicle ignition off or ECU failure, the input terminal of the three-phase steering motor included in the EPS system, particularly the SBW steering motor, may be floated, and the steering motor rotates arbitrarily accordingly, resulting in problems with vehicle stability.

Therefore, there may be provided a locking circuit capable of preventing motor rotation by shorting the input terminal to a three-phase coil of a reaction force motor or steering motor included in the SBW steering system to the same potential in the case of the vehicle ignition off or ECU failure.

Meanwhile, an EPS system including the SBW steering system may include a steering control circuit for controlling a steering motor.

Specifically, in order to drive or control the steering motor, a SBW steering controller may include a power supply unit and a steering control circuit to supply driving current to the steering motor.

The steering control circuit may include, for example, but not limited to, a steering controller, a steering ECU, and the like.

In general, the steering control circuit included in the EPS system may include an inverter having a plurality of switch devices or switch elements, and an inverter driving circuit or a gate driving circuit for controlling the inverter.

The steering control circuit included in the SBW steering system may further include a locking circuit configured to prevent the rotation of the steering motor or reaction force motor in the case of the vehicle ignition off or ECU failure, as described above.

An example of the locking circuit included in the steering control circuit of the EPS system or the SBW steering system will be described in more detail with reference to FIG. 5 below.

Meanwhile, in the EPS system, at least one of a sensor unit, a steering control circuit, and a steering motor may be redundant or duplicated in order to secure stability or output power.

As an example, a redundant steering system may include a first ECU and a second ECU that perform corresponding functions to control the steering motor.

Figure 3:
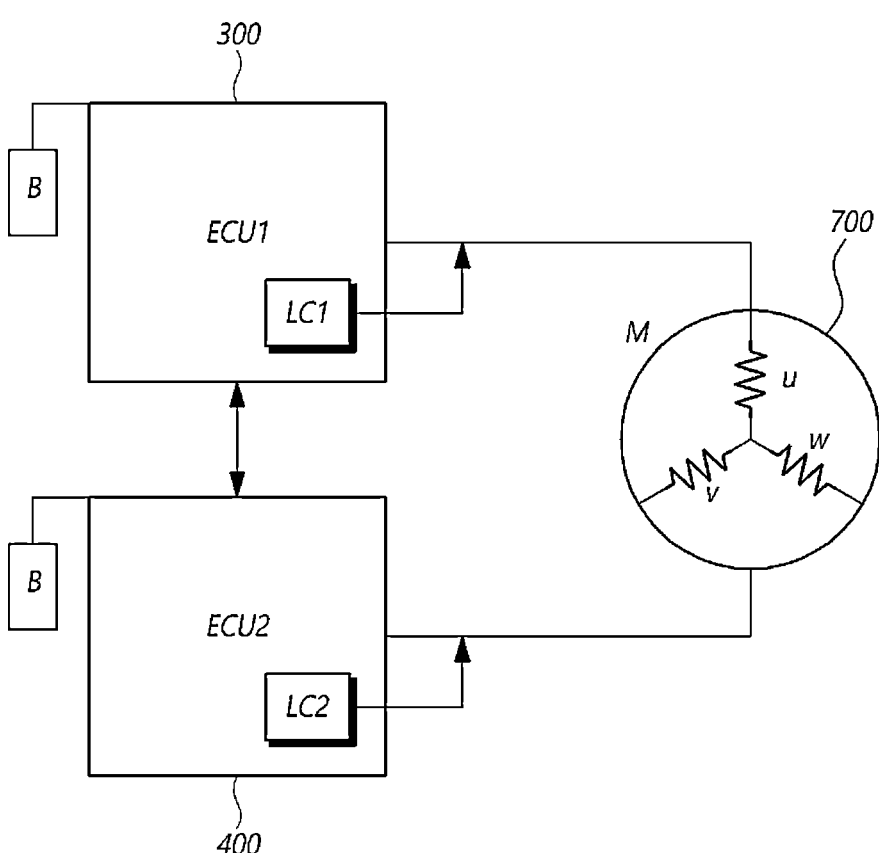
FIG. 3 illustrates a schematic configuration of a redundant steering system having two steering controllers according to an embodiment of the present disclosure.

FIG. 3 illustrates a schematic configuration of a redundant steering system having a plurality of steering controllers according to an embodiment of the present disclosure.

Referring to FIG. 3, the redundant steering system may include a first ECU 300 and a second ECU 400.

In the redundant steering system, one of the first ECU 300 and the second ECU 400 may be set as a main ECU to mainly perform steering control. In addition, if a failure occurs in the main ECU, the steering control may be continuously performed by the remaining ECU to provide a fail-safe function.

Alternatively, in the redundant steering system, the motor output can be increased by supplying current to the motor using both the first ECU 300 and the second ECU 400.

The redundant SBW steering system may include duplicated ECUs such as a first ECU and a second ECU, and the first ECU and the second ECU may include a first locking circuit and a second locking circuit configured as described above, respectively.

For example, as shown in FIG. 3, the first ECU 300 may include a first locking circuit LC1, and the second ECU 400 may include a second locking circuit LC2.

The first locking circuit LC1 may operate in the case that the vehicle ignition is turned off or a failure of the first ECU 300 occurs, and may block the first ECU 300 from controlling the motor 700.

Similarly, the second locking circuit LC2 may operate in the case that the vehicle ignition is turned off or a failure of the second ECU 400 occurs, and may block the second ECU 400 from controlling the motor 700.

Here, the motor 700 may be a reaction force motor (e.g. 117 in FIG. 2) included in the upper device 110 of the SBW steering system or a steering driving motor (e.g. 127 in FIG. 2) included in the lower device 120 of the SBW steering system.

The blocking of motor control by the locking circuit LC1 or LC2 may be performed by cutting off driving current supplied from the inverter to the motor or cutting off power supply to the inverter.

In the redundant SBW steering system of FIG. 3, if a failure occurs in one of the first ECU 300 and the second ECU 400, a locking circuit LC1 or LC2 included in the ECU 300 or 400 with a failure may operate to constraint the rotation of the motor 700.

For example, in the system shown in FIG. 3, if a failure or abnormality occurs only in the first ECU 300, the first locking device LC1 included in the first ECU may operate to constraint or block the rotation of the motor 700.

As described above, in the redundant SBW steering system, even if a failure occurs in one steering control circuit (ECU), steering control may be continuously performed through the remaining normal steering control circuit(s).

Therefore, in the case that a failure occurs in only one of the redundant steering control circuits, there is a problem that the rotation of the motor is restricted by the locking device of the faulty steering control circuit even though steering control is required to be continuously performed through the normal steering control circuit.

Therefore, it is required to solve the problem that normal steering control is impossible due to the locking of the motor even if a failure occurs in one steering control circuit in the redundant SBW steering system having two or more steering control circuits.

Figure 4:
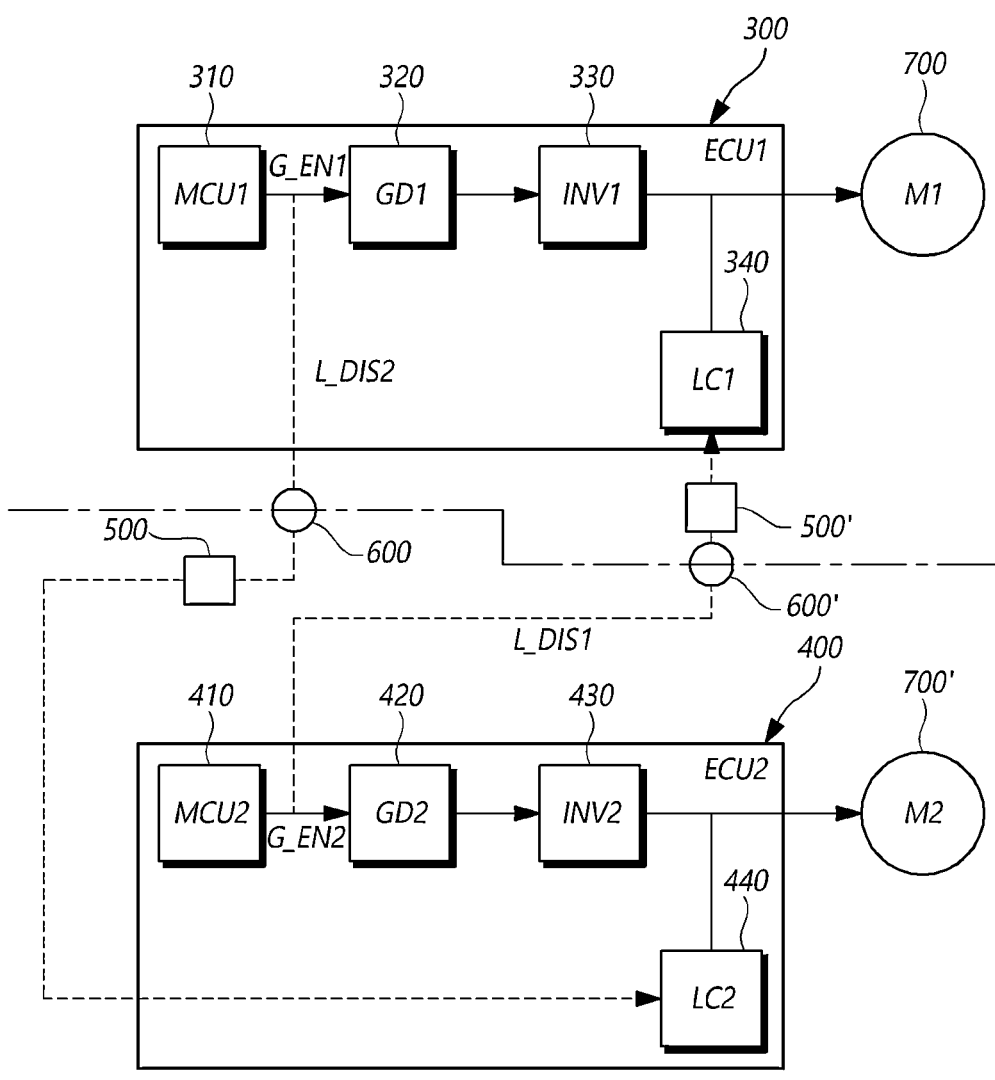
FIG. 4 illustrates a redundant steering control device according to an embodiment of the present disclosure.

FIG. 4 illustrates a redundant steering control device according to an embodiment of the present disclosure.

Referring to FIG. 4, a redundant steering system according to an embodiment of the present disclosure may include a control device including a first ECU 300 and a second ECU 400, and a motor 700 or 700' controlled by the first ECU 300 and the second ECU 400.

The control device for the redundant steering system according to an embodiment of the present disclosure may be applied, in particular, to the SBW steering system. In this case, the motor 700 and 700' may be a reaction force motor (e.g. 117 in FIG. 2 or 1170 in FIG. 12) included in the upper device 110 or 1100 of the SBW steering system or a steering driving motor (e.g. 127 in FIG. 2 or 1270 in FIG. 12) included in the lower device 120 or 1200 of the SBW steering system.

In addition, as shown in FIG. 4, a motor (M1) 700 controlled by the first ECU 300 and a motor (M2) 700' controlled by the second ECU 400 may be two separate motors or may be one same motor.

That is, in the redundant steering system according to an embodiment of the present disclosure, the first ECU 300 and the second ECU 400 may control one reaction force motor or one steering driving motor.

The first ECU 300 may be expressed as a first steering controller or a first controller, and may include a first inverter (INV1) 330, a first locking circuit (LC1) 340 connected to the first inverter 330, and a first gate driver (GD1) 320 configured to control the driving of the first inverter 330.

Similarly, the second ECU 400 may be expressed as a second steering control unit or a second controller, and may include a second inverter (INV2) 430, a second locking circuit (LC2) 440 connected to the second inverter 430, and a second gate driver (GD2) 420 configured to control the driving of the second inverter 430.

In the control device for the redundant steering system according to an embodiment of the present disclosure, if the first ECU 300 operates normally, the first ECU 300 may generate a second lock disable signal L_DIS2 for inactivating the second locking circuit 440 included in the second ECU 400 and transmit the second lock disable signal L_DIS2 to the second ECU 400.

Similarly, in the control device for the redundant steering system according to an embodiment of the present disclosure, if the second ECU 400 operates normally, the second ECU 400 may generate and transmit a first lock disable signal L_DIS1 for inactivating the first locking circuit 340 included in the first ECU 300 to the first ECU 300.

That is, in the redundant steering control device according to an embodiment of the present disclosure, a normally operating ECU may transmit a lock disable signal to a locking device included in another ECU to disable the lock function of the locking device included in another ECU.

In this case, the second locking circuit (LC2) 440 included in the second ECU 400 may include two switching devices (e.g. two switches), and may be activated or deactivated in response to the second lock disable signal L_DIS2 received from the first ECU 300.

For instance, if the second lock disable signal L_DIS2 is a high level signal, the second locking circuit (LC2) 440 may be deactivated so that the locking circuit 440 capable of locking of the motor 700' may not operate.

Specifically, if the second lock disable signal L_DIS2 is in an ON state or a high level signal, the second locking circuit (LC2) 440 may be deactivated, and thus the driving of the motor 700' by the second inverter 410 can be performed normally.

On the other hand, if the second lock disable signal L_DIS2 is in an OFF state or a low level signal, the second locking circuit (LC2) 440 may be activated, so that the motor 700' may be restrained by blocking the control of the motor 700' performed by the second inverter 430.

As an example, when the second locking circuit (LC2) 440 is activated, the three-phase output voltages of the second inverter 410 may be shorted to the same potential.

If the three-phase output voltage of the second inverter 430 is shorted, the three-phase windings of the motor 700', that is, a u-winding, a v-winding, and a w-winding may be shorted.

In this state, if a rotor of the motor 700' rotates, counter electromotive force may be generated so that the rotation of the motor may be restricted.

The detailed configuration and motor locking function of the locking circuit 340, 440 will be described in more detail below with reference to FIG. 5.

Each of the first inverter 330 and the second inverter 430 included in the first ECU 300 and the second ECU 400, respectively, according to the present embodiment may convert a voltage supplied from the battery, which is a direct current (DC), to an alternating current (AC), or may apply an AC voltage (or AC current) to the motors 700 and 700'.

Specifically, each of the first inverter 330 and the second inverter 430 may convert the voltage, supplied from the battery, into AC and apply the AC voltage or AC current to each phase of the motor 700 and 700'.

The first ECU 300 may further include a first micro control unit (MCU1) 310 configured to generate a first gate driver enable signal G_EN1 for activating the first gate driver 320 and transmit the first gate driver enable signal G_EN1 to the first gate driver 320.

In the case that the first ECU 300 operates normally, the first MCU 310 may supply the first gate driver enable signal G_EN1 to the first gate driver 320, and simultaneously may transmit the second lock disable signal L_DIS2 to the second ECU 400.

In this case, the second lock disable signal L_DIS2 may be the same signal as the first gate driver enable signal G_EN1.

In addition, the first MCU 310 may monitor whether the first ECU 300 normally operates.

Alternatively, a separate module or device can monitor the state of the first ECU 300 and detect whether the first ECU 300 normally operates.

The failure or abnormality of the first ECU 300 may include a state in which power is not supplied to the first ECU 300, a state in which a failure occurs in the first MCU 310, a state in which a circuit failure occurs in the first inverter 330, but not limited thereto.

Similarly, the second ECU 400 may further include a second micro control unit (MCU2) 410 configured to generate a second gate driver enable signal G_EN2 for activating the second gate driver 420 and transmit the second gate driver enable signal G_EN2 to the second gate driver 220.

If the second ECU 400 operates normally, the second MCU 410 may generate and transmit the second gate driver enable signal G_EN2 to the second gate driver 420, and at the same time, may generate and transmit a first lock disable signal L_DIS2 for inactivating the first locking circuit LC1 340 to the first ECU 300.

In this case, the first lock disable signal L_DIS1 may be the same signal as the second gate driver enable signal G_EN2.

In addition, the second MCU 410 may monitor whether the second ECU 400 normally operates, or a separate module or device can monitor the state of the second ECU 400 and detect whether the second ECU 400 operates normally.

The failure or abnormality of the second ECU 400 may include a state in which power is not supplied to the second ECU 400, a state in which a failure occurs in the second MCU 410, a state in which a circuit failure occurs in the second inverter 430, but is not limited thereto.

In addition, the motors 700 and 700' controlled by the steering control device according to an embodiment of the present disclosure may be three-phase motors having u-phase, v-phase, and w-phase.

In this case, each of the first inverter 330 and the second inverter 430 may include an H-bridge circuit supplying u-phase driving current, v-phase driving current, and w-phase driving current.

In addition, the second locking device (LC2) 440 may include a second u-phase locking circuit 440_u connected to an u-phase driving current output terminal of the second inverter 430, a second v-phase locking circuit 440_v connected to an v-phase driving current output terminal of the second inverter 430, and a second w-phase locking circuit 440_w connected to an w-phase driving current output terminal of the second inverter 430.

In this case, the second lock disable signal L_DIS2 may be transmitted or supplied to all of the second u-phase locking circuit 440_u, the second v-phase locking circuit 440_v, and the second w-phase locking circuit 440_w.

If the second lock disable signal L_DIS2 is in an ON state or a high level state, all of the second u-phase locking circuit 440_u, the second v-phase locking circuit 440_v and the second w-phase locking circuit 440_w may be disabled or deactivated.

As a result, if the second lock disable signal L_DIS2 is in the ON state or the high level state, the u-phase driving current output terminal, the v-phase driving current output terminal, and the w-phase driving current output terminal of the second inverter may have different potentials, respectively, to that the second inverter 430 can operate normally.

The configurations of the first locking circuit LC1 340 and the second locking circuit LC2 440 will be described in more detail below with reference to FIG. 5.

Meanwhile, the controller of the steering system according to an embodiment of the present disclosure may further include a voltage regulation switch 500 disposed on a transmission path of the second lock disable signal L_DIS2.

Similarly, if the second ECU 400 operates normally, the second ECU 400 may transmit a first lock disable L_DIS1 to the first ECU 300, more specifically, to the first locking circuit (LC1) 340 included in the first ECU 300.

A voltage regulation switch 500' may also be disposed on the transmission path of the first lock disable signal L_DIS1.

The voltage regulation switches 500 and 500' may output a battery level voltage E1_BAT in response to the second lock disable signal L_DIS2 or the first lock disable signal L_DIS1.

A reference voltage (including ground) may be shifted or offset between a plurality of ECUs.

In this case, there may also occur a difference in the voltage level of a signal generated by each ECU.

For example, in the case that the reference voltage shift occurs between the first ECU 300 and the second ECU 400 included in the control device according to an embodiment of the present disclosure, the difference may occur in the voltages of the lock disable signals L_DIS1 and L_DIS2 transmitted from the first ECU 300 and the second ECU 400, respectively.

In this case, a locking circuit included in one ECU may misrecognize a lock disable signal L_DIS1 or L_DIS2 transmitted from the other ECU so that the lock disable function may not be performed.

However, if the voltage regulation switches 500 and 500' are included in the control device for the redundant steering system according to an embodiment of the present disclosure, even if a difference occurs in the input voltages of the lock disable signals L_DIS1 and L_DIS2, the voltage corresponding to the lock disable signal having the same potential, that is, a battery level voltage E1_VBAT, can be output, thereby preventing the misrecognition of the lock disable signal.

An example of specific circuit configuration of the voltage regulation switches 500 and 500' will be described in more detail below with reference to FIG. 6.

In addition, the control device according to an embodiment of the present may further include an isolator 600 disposed on a transmission path of the second lock disable signal L_DIS2.

Similarly, another isolator 600' may be also disposed on the transmission path of the first lock disable L_DIS1 transmitted from the second ECU 400 to the first ECU 300.

In this case, the isolators 600 and 600' may be an opto-coupler including an optical transmission element or transmitter which emits light in response to the second lock disable signal L_DIS2, and an optical reception element or receiver which is turned on by the light emitted by the optical transmitter and outputs a signal corresponding to the second lock disable signal L_DIS2.

The isolators 600 and 600' may be configured to insulate between the first ECU 300 and the second ECU 400, while allowing the lock disable signals L_DIS1 and L_DIS2 to be safely transmitted between the first ECU 300 and the second ECU 400.

The isolators 600 and 600' may be a switching device (e.g. a switch) that does not require a separate power source for its driving. If an input lock disable signal L_DIS2 is at a high level, the isolators 600 and 600' may generate and output a corresponding output lock disable signal L_DIS2'.

An example of specific circuit configuration of the isolators 600 and 600' will be described in more detail below with reference to FIG. 7.

In the control device of the EPS system according to an embodiment of the present disclosure, in the case that a failure or abnormality occurs in only one steering control circuit (ECU) in the redundant SBW steering system, a remaining normal steering control circuit (ECU) may inactivate a motor locking circuit of the steering control circuit (ECU) having the failure or abnormality in order to prevent the motor from being inappropriately locked.

Therefore, even if a failure or abnormality occurs in one steering control circuit in the redundant SBW steering system having two or more steering control circuits (ECUs), a motor locking circuit included in the steering control circuit in which the failure or abnormality occurs may be deactivated to solve the problem that normal steering control cannot performed due to the inappropriate locking of the motor.

Figure 5:
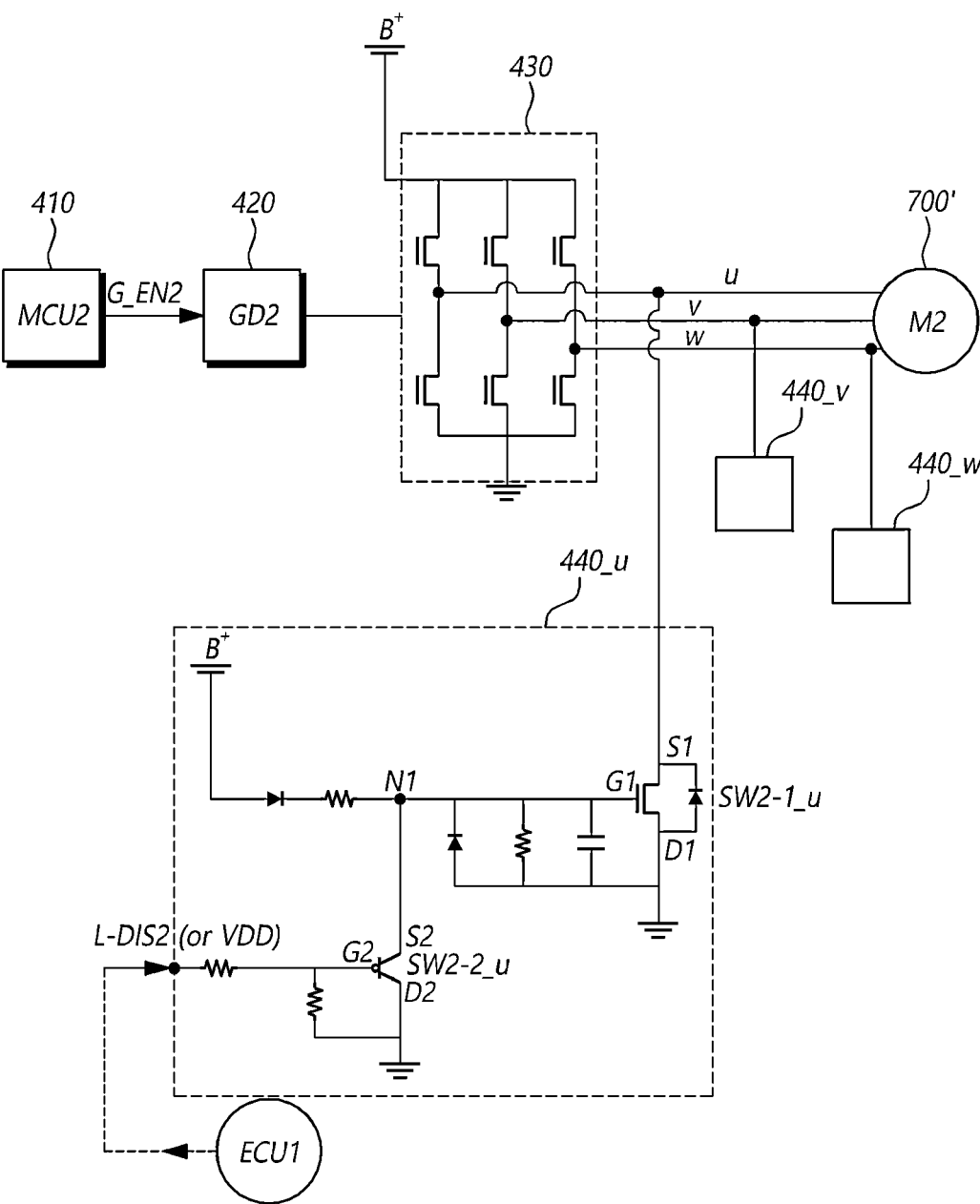
FIG. 5 illustrates a circuit diagram of a second locking circuit included in a steering controller according to an embodiment of the present disclosure.

FIG. 5 illustrates a circuit diagram of a second locking circuit included in a steering controller according to an embodiment of the present disclosure.

FIG. 5 illustrates the detailed circuit configuration of a second u-phase locking circuit 440_u among the second u-phase locking circuit 440_u, a second v-phase locking circuit 440_v and a second w-phase locking circuit 440_w 2 constituting the second locking circuit LC2 440.

The most configuration of the second v-phase locking circuit 440_v and the second w-phase locking circuit 440_w is the same as or similar to the second u-phase locking circuit 440_u, but the second v-phase locking circuit 440_v and the second w-phase locking circuit 440_w may be different from the second u-phase locking circuit 440_u only in a connection position with the second inverter 430. In addition, the first locking circuit (LC1) 340 included in the first ECU 300 may also have the same or similar configuration as or to the second locking circuit (LC2) 440 of FIG. 5.

For example, the second locking circuit (LC2) 440 included in the second ECU 400 may include two switches and may be activated or deactivated in response to the second lock disable signal L_DIS2 received from the first ECU 300.

The second locking circuit (LC2) 440 included in the second ECU 400 may include a second-1 switching device or switch connected to an output node of the inverter 430 and a second-2 switching device or switch for turning on or off the second-1 switching device, and the second lock disable signal L_DIS2 may be supplied to a second gate node of the second-2 switching device or switch.

For example, referring to FIG. 5, the second u-phase locking circuit 440_u, which is a part of the second locking circuit 440, may include a second-1 switching device SW2-1_u connected to a u-phase output node of the second inverter 430 and a second-2 switching device SW2-2_u for turning on or off the second-1 switching device SW2-1_u.

In this case, the second lock disable signal L_DIS2 may be supplied to a second gate node G2 of the second-2 switching device SW2-2_u.

The second-1 switching device SW2-1_u of the second u-phase locking circuit 440_u may include a first gate node G1 connected to a high potential voltage B+, a first source node S1 connected to the u-phase output node of the second inverter 430 and a first drain node D1 grounded.

The second-2 switching device SW2-2_u may include a second source node S2 connected to a first node Ni between the high potential voltage B+ and the first gate node G1 of the second-1 switching device SW2-1_u, a second drain node D2 grounded, and the second gate node G2 to which the second lock disable signal L_DIS2 can be applied.

In this case, the second lock disable signal L_DIS2 transmitted from the first ECU 300 may be input to the second gate node G2 of the second-2 switching device SW2-2_u, or a separate second driving voltage VDD may be applied to the second gate node G2 of the second-2 switching device SW2-2_u.

The second driving voltage VDD may be a voltage input from a power supply unit (e.g. a battery) only if the second ECU 400 operates normally.

In the case that the second ECU 400 operates normally, the second driving voltage VDD of a high level may be applied to the second gate node G2 of the second-2 switching device SW2-2_u to supply a normal u-phase driving current to the motor by turning off the second-1 switching device SW2-1_u.

However, if a failure or abnormality occurs in the second ECU 400, the second driving voltage VDD may not be supplied.

In this case, if the first ECU 300 is normal, the second lock disable signal L_DIS2 transmitted from the first ECU 300 may be input to the second gate node G2 of the second-2 switching device SW2-2_u.

Referring to FIG. 5, if the second lock disable signal L_DIS2 is a high level signal, the second-2 switching device SW2-2_u is turned on, and then the first node Ni is in a ground state.

Accordingly, since the second-1 switching device SW2-1_u is turned off, the second locking circuit (LC2) 440 is deactivated, and a normal u-phase driving current may be supplied to the motor 700'.

As a result, if the first ECU 300 is normal even when a failure or abnormality occurs in the second ECU 400, motor restraint does not occur and steering control by the first ECU 300 may be continuously performed.

That is, if the second lock disable signal L_DIS2 is a high level signal, the second locking circuit LC2 440 is deactivated so that the motor cannot be locked and the motor 700' can operate normally.

Specifically, in the case that the second lock disable signal L_DIS2 is an ON state or a high level signal, the second locking circuit LC2 440 may be deactivated, and the motor 700' may be normally driven by the second inverter 410.

On the other hand, if a failure or abnormality occurs in both the first ECU 300 and the second ECU 400 or if the vehicle ignition is off, the high level second lock disable signal L_DIS2 and the second driving voltage VDD cannot be input to the second gate node G2 of the second-2 switching device SW2-2_u.

Accordingly, the second-2 switching device SW2-2_u is turned off, the first node N1 becomes the high potential voltage B+, and accordingly the second-1 switching device SW2-1_u is turned on. As a result, the u-phase output node of the second inverter 430 is grounded.

Referring to FIG. 5, in the same operation and principle as described above, a v-phase output node and a w-phase output node of the second inverter 430 may be also grounded, so that all three-phase output voltages of the second inverter 410 may be shorted to the same potential.

When the three-phase output voltages of the second inverter 430 are shorted, the three-phase windings of the motor 700', that is, a u-winding, a v-winding, and a w-winding are shorted.

In this state, if a rotor of the motor rotates, counter electromotive force may be generated such that the rotation of the motor may be restricted.

Therefore, if a failure or abnormality occurs in both the first ECU 300 and the second ECU 400 or if the vehicle ignition is off, the second locking circuit LC2 440 may be activated and the rotation of the motors 700 and 700' is constrained.

The high potential voltage B+ may be external power input from the outside of the second ECU 400, and the second driving voltage VDD may be internal power supplied from the inside of the second ECU 400.

Therefore, in the case that a failure or abnormality occurs in each ECU, if the external power supply is normal, the high potential voltage B+ from the outside of the second ECU 400 may be normally supplied, but the driving voltage VDD generated from the inside of the second ECU 400 may not be supplied.

In addition, as shown in FIG. 5, the locking circuit according to an embodiment of the present disclosure may further include a plurality of resistance elements or registers for flowing current, a capacitor for charging electric charges to drive the switching device or switches, and a diode that prevents reverse flow of current.

Figure 6:
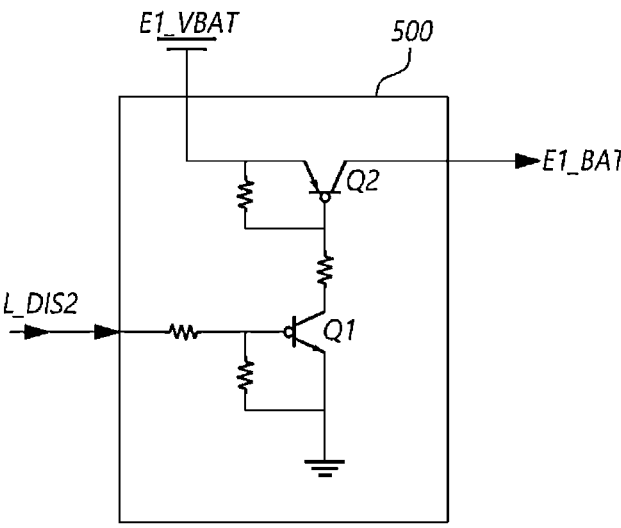
FIG. 6 illustrates a circuit diagram of a voltage regulation switch included in a control device of an electric power steering system according to an embodiment of the present disclosure.

FIG. 6 illustrates a circuit diagram of a voltage regulation switch included in a control device of an electric power steering system according to an embodiment of the present disclosure.

A voltage regulation switch 500 may be connected or disposed on a transmission path of the lock disable signal L_DIS transmitted between ECUs.

In the exemplary embodiment of FIG. 4, the voltage regulation switch 500 may be disposed on the transmission path of the second lock disable signal L_DIS2 transmitted from the normal first ECU 300 to the second ECU 400.

Referring to FIG. 6, the voltage regulation switch 500 may include two transistors, switching devices or switches Q1 and Q2.

The first transistor Q1 may control the turn-on or turn-off of the second transistor Q2. That is, the second transistor Q2 may be turned on or turned off according to the turn-on or turn-off of the first transistor Q1.

The second transistor Q2 may be turned on under the control of the first transistor Q1 to output a battery level voltage E1_VBAT connected to a source node.

If the high level second lock disable signal L_DIS2 is input to the voltage regulation switch 500 as shown in FIG. 6, the first transistor Q1 is turned on, and the second transistor Q2 is also turned on accordingly. Therefore, the voltage regulation switch 500 may output the battery level voltage E1_VBAT.

Similarly, as illustrated in FIG. 4, the voltage regulation switch 500' may be disposed on a transmission path of the first lock disable signal L_DIS1 transmitted from the normally operating second ECU 400 to the first ECU 300.

The voltage regulation switches 500 and 500' may prevent signal misrecognition caused by a reference voltage shift between ECUs.

A reference voltage (including ground) may be shifted or offset between a plurality of ECUs, and thus, a difference in a voltage level of a signal generated by each ECU may occur.

If such a problem occurs in the steering control device, a difference in the voltages of the lock disable signals L_DIS1 and L_DIS2 transmitted from each ECU may occur.

In this case, the locking circuit included in the ECU may misrecognize the lock disable signal L_DIS1 and/or L_DIS2 transmitted from other ECU(s) so that the lock disable function may not be stably performed.

Therefore, if the voltage regulation switches 500 and 500' configured as shown in FIG. 6 are used, even if a difference in the input voltages of the lock disable signals L_DIS1 and L_DIS2 occurs, the lock disable signal of the same potential, that is, the battery level voltage E1_VBAT may be transmitted to other ECUs in order to prevent erroneous recognition of the lock disable signal.

Figure 7:
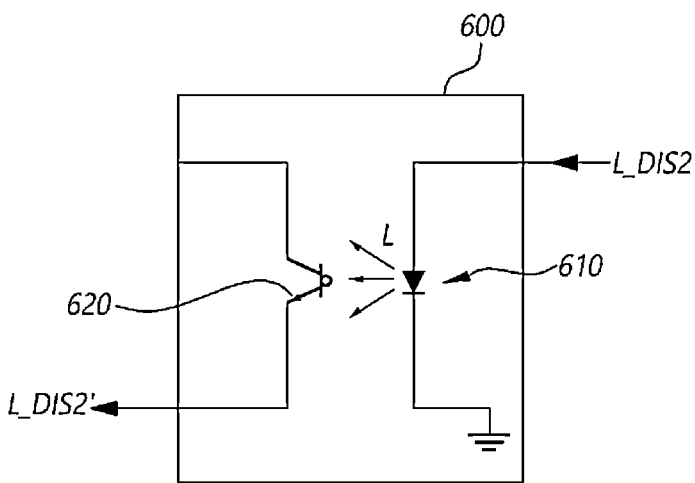
FIG. 7 illustrates a configuration of an isolator included in a controller of an electric power steering system according to an embodiment of the present disclosure.

FIG. 7 illustrates a configuration of an isolator included in a controller of an electric power steering system according to an embodiment of the present disclosure.

As shown in FIG. 4, the control device according to an embodiment of the present disclosure may further include an isolator 600 disposed on a transmission path of the second lock disable signal L_DIS2.

Similarly, referring to FIG. 4, an isolator 600' may also be disposed on a transmission path of the first lock disable signal L_DIS1 transmitted from the second ECU 400 to the first ECU 300 in the case that the second ECU 400 operates normally.

Referring to FIG. 7, each of the isolators 600 and 600' according to an embodiment of the present disclosure may include an optical transmission element or transmitter 610 configured to emit light in response to the second lock disable signal L_DIS2, and an optical receipt element or receiver 620 configured to be turned on in response to the light emitted by the optical transmitter 610 and output a signal corresponding to the second lock disable signal L_DIS2 (i.e., an output lock disable signal).

For example, the isolator 600 and 600' according to an embodiment of the present disclosure may be an opto-coupler or a photo-coupler, but is not limited thereto.

Each of the isolators 600 and 600' according to an embodiment of the present disclosure may be a switching means (e.g. a switch) that does not require a separate power source for its driving. However, as long as the output lock disable signal L_DIS2' corresponding the input lock disable signal L_DIS2 of a high level is generated or output, the implementation of the isolator 600 and 600' is not limited to a specific device or component.

Since the isolators 600 and 600' transmit signals without a separate power source, the isolator 600 and 600' may be configured to insulate between the ECUs, while enabling the safe transmission of lock disable signals L_DIS1 and L_DIS2 between the ECUs.

In addition, the control device of the electric steering system according to an embodiment of the present disclosure may include both the voltage regulation switches 500 and 500' shown in FIG. 6 and the isolators 600 and 600' shown in FIG. 7.

Alternatively or additionally, the isolators 600 and 600' may further include a separate switching unit or switch to generate the output lock disable signals L_DIS1' and L_DIS2' having safe and constant voltage on the output side.

In this case, the switching unit or switch may be the voltage regulation switches 500 and 500' shown in FIG. 6, but not limited thereto.

Figure 8:
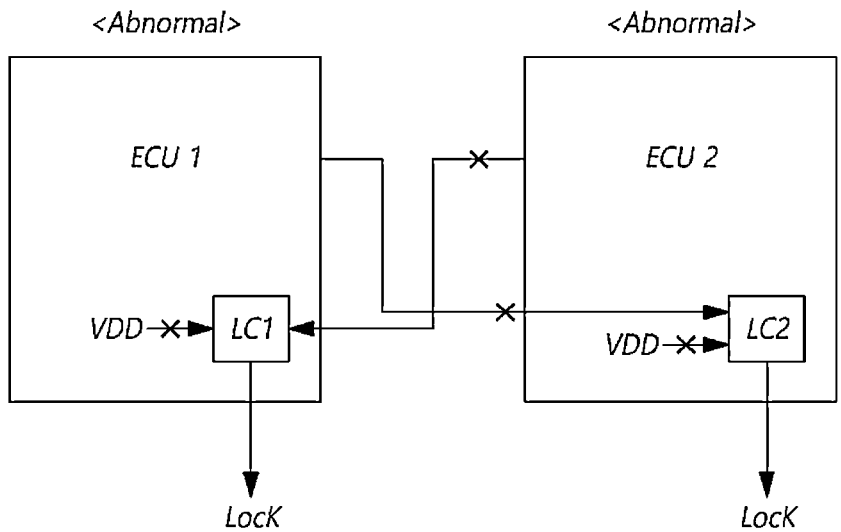
FIGS. 8 to 10 illustrate exemplary states of a first locking circuit and a second locking circuit depending on normal and abnormal states of a first steering controller and a second steering controller included in a control device of a redundant electric steering system according to an embodiment of the present disclosure.
Figure 9:
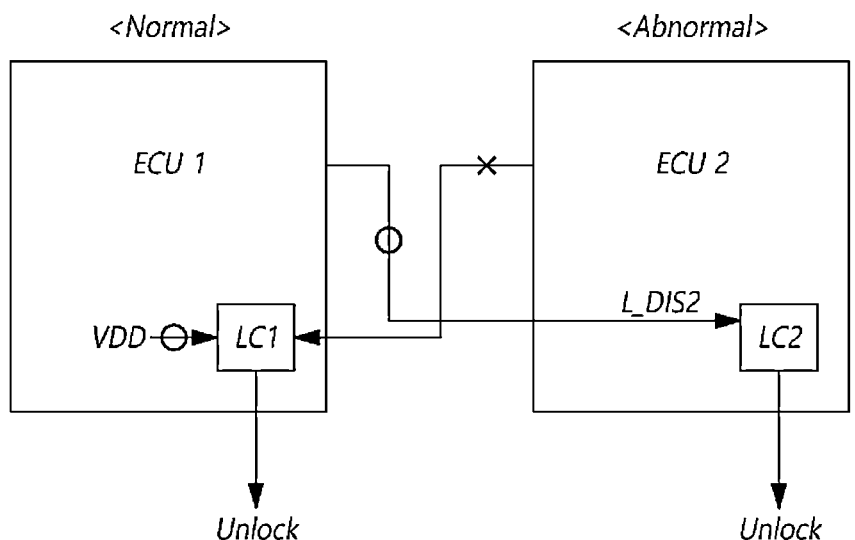
Figure 10:
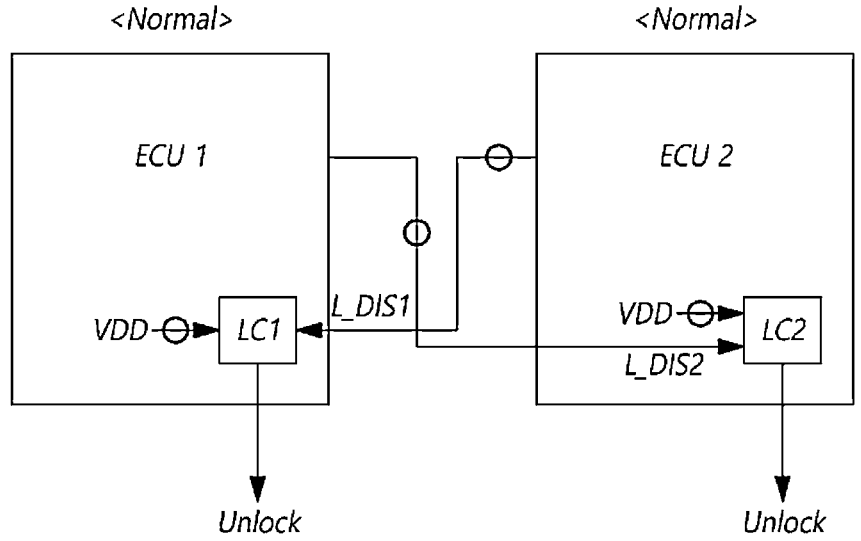

FIGS. 8 to 10 illustrate exemplary states of a first locking circuit LC1 and a second locking circuit LC2 depending on normal and abnormal states of a first steering controller ECU1 and a second steering controller ECU2 included in a control device of a redundant electric steering system according to an embodiment of the present disclosure.

Specifically, FIG. 8 illustrates a case in which both the first ECU 300 and the second ECU 400 in the embodiment of FIG. 4 are abnormal or fail, or the vehicle ignition or the vehicle engine is turned off.

In addition, FIG. 9 illustrates a case in which the first ECU is in a normal state and a failure or abnormality occurs in the second ECU, and FIG. 10 illustrates a case in which both the first ECU and the second ECU are in a normal state.

Referring to the exemplary case of FIG. 8, if a failure or abnormality occurs in both the first ECU and the second ECU or the vehicle ignition is turned off, both the driving voltage VDD and the lock disable signals L_DIS may be not supplied to both the first locking circuit LC1 and the second locking circuit LC2.

That is, since a failure or abnormality occurs in both the first ECU and the second ECU or the vehicle ignition is turned off, the driving voltage VDD, which is the internal voltage internally generated in each of the first and second ECUs, is not supplied to the first and second locking circuits LC1 and LC2.

In addition, since a failure or abnormality occurs in both the first ECU and the second ECU, the lock disable signal L_DIS, which can be transmitted by a normal ECU to the other ECU, is not supplied.

Accordingly, both the first locking circuit LC1 and the second locking circuit LC2 are activated.

Therefore, as described in FIG. 5, all three-phase (u, v, w-phases) output nodes of the inverter 430 may be shorted to the same potential (e.g., ground) by the high potential voltage B+ supplied by the external power supply so that the rotation of the motor 700 and/or 700' may be constrained.

Specifically, in the redundant SBW steering system, in the case that a failure or abnormality occurs in both the first ECU and the second ECU or the vehicle ignition is turned off, the rotation of the reaction force motor 117 or 1170 included in the upper device 110 or 1100 may be constrained or locked to prevent rapid steering of the steering wheel 112.

In addition, in the case that a failure or abnormality occurs in both the first ECU and the second ECU or the vehicle ignition is turned off, the rotation of the steering driving motor 127 or 1270 included in the lower device 120 or 1200 may be restricted or locked, thereby preventing the arbitrary steering of the vehicle wheels 128.

That is, the control device according to an embodiment of the present disclosure may be applied to the redundant ECU of the upper device 110 or 1100 of the SBW steering system to prevent sudden steering of the steering wheel 112, and may be applied to the redundant ECU of the lower device 120 or 1200 of the SBW steering system to prevent the arbitrary steering of the vehicle wheels 128.

Generally, in the SBW steering system, if the vehicle ignition is off or both ECUs fail or are in an abnormal state, the random steering of the vehicle wheels 128 is more important for stability than the sudden steering of the steering wheel 112.

Since the upper device 110 or 1100 and the lower device 120 or 1200 are mechanically separated or are not mechanically connected in the SBW steering system, even if the steering wheel 112 connected to the upper device 110 or 1100 is rapidly steered, only the steering feeling provided to the driver may be degraded, however there is no other risk due to the arbitrary steering of the vehicle wheels 128.

Therefore, the steering control device according to an embodiment of the present disclosure may have a greater significance in preventing random steering of the vehicle wheel 128 by being applied to the redundant ECU of the lower device 120 or 1200 of the SBW steering system.

FIG. 9 illustrates an exemplary state in which the first ECU is in a normal state and the second ECU has a failure or is in an abnormal state.

Referring to FIG. 9, since the first ECU is in a normal state, the first ECU may generate a second lock disable signal L_DIS2 for inactivating the second locking circuit LC2 included in the second ECU, and transmit the second lock disable signal L_DIS2 to the second ECU.

If the second lock disable signal L_DIS2 of the high level is input to the second locking circuit LC2 as shown in FIG. 5, the second locking circuit LC2 is deactivated, and thus the motor is not locked by the second locking circuit LC2.

Meanwhile, since the first ECU is in a normal state, the driving voltage VDD is input to the first locking circuit LC1 included in the first ECU, and thus the first locking circuit LC1 is also deactivated.

Accordingly, the first inverter included in the first ECU may normally supply the motor driving current to the motor to control the motor.

Accordingly, in the EPS system, particularly in the SBW steering system, even if only one of the redundant ECUs fails or is in an abnormal state, the normal ECU may deactivate the motor locking circuit included in the failed or abnormal ECU, and therefore the normal ECU may continuously perform the control of the motor.

The steering control device according to an embodiment of the present disclosure may be preferably applied to the SBW steering system.

For example, the control device according to an embodiment of the present disclosure may be applied to a steering control unit for controlling a reaction force motor included in an upper device of an SBW steering system.

Alternatively, the control device according to an embodiment may be applied to a steering control unit for controlling a steering driving motor (e.g. 127 of FIG. 2 or 1270 in FIG. 12) included in a lower device (e.g. 120 of FIG. 2 or 1200 of FIG. 12) of the SBW steering system.

Alternatively, the control device according to an embodiment of the present disclosure may be applied to both a steering control unit for controlling a reaction force motor (e.g. 117 of FIG. 2 or 1170 in FIG. 12) included in an upper device (e.g. 110 of FIG. 2 or 1100 in FIG. 12) of the SBW steering system and a steering control unit for controlling a steering driving motor (e.g. 127 of FIG. 2 or 1270 in FIG. 12) included in a lower device (e.g. 120 of FIG. 2 or 1200 in FIG. 12) of the SBW steering system.

FIG. 10 illustrates an exemplary case in which both the first ECU and the second ECU are in a normal state.

Referring to FIG. 10, since both the first ECU and the second ECU are in a normal state, each ECU may generate a lock disable signal for disabling a locking circuit included in the other ECU and transmit the lock disable signal to the other ECU.

Therefore, a lock disable signal L_DIS of the high level is input to all of the locking circuits LC1 and LC2 included in the first ECU and the second ECU, respectively. Accordingly, both of the two locking circuits are deactivated, and the motor is not locked by the locking circuits LC1 and LC2.

Therefore, the inverter included in each ECU may normally supply the motor driving current to the motor to control the motor. That is, both ECUs can normally control the motor.

Figure 11:
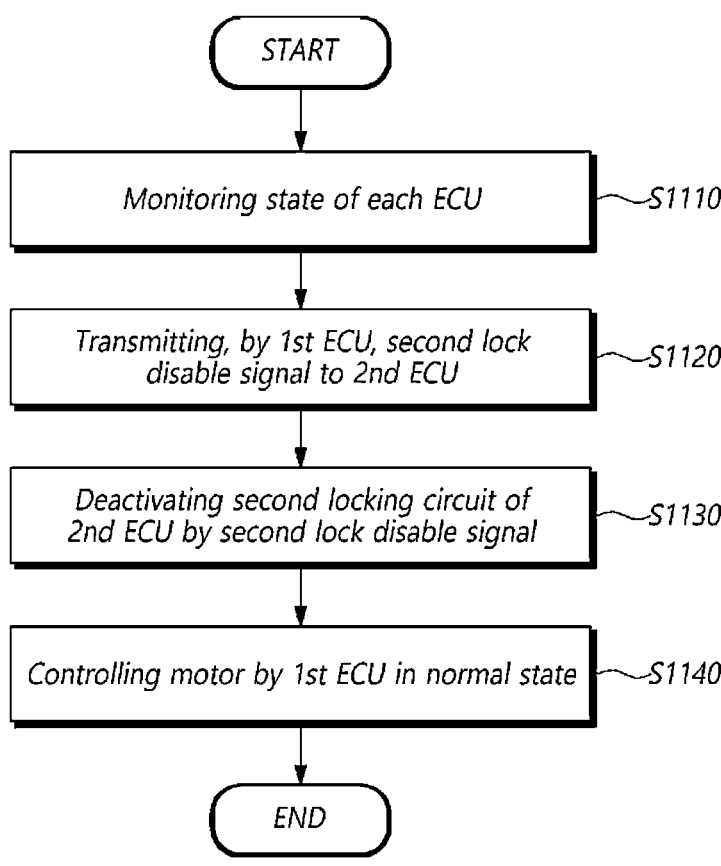
FIG. 11 is a flowchart of a method of controlling an electric power steering system according to an embodiment of the present disclosure.

FIG. 11 is a flowchart for illustrating a method of controlling an electric power steering system according to an embodiment of the present disclosure.

The method of controlling the electric power steering system according to an embodiment of the present disclosure may be performed by a redundant control device including the first ECU 300 and the second ECU 400 described in FIG. 4.

The control method according to an embodiment of the present disclosure may be performed in a redundant electric steering system in which a first steering controller (ECU) includes a first inverter, a first locking circuit connected to the first inverter, and a first gate driver controlling the driving of the first inverter, and a second steering controller (ECU) includes a second inverter, a second locking circuit connected to the second inverter, and a second gate driver controlling the driving of the second inverter.

Specifically, the control method according to an embodiment of the present disclosure may include monitoring, by the first ECU, an operating state of the first ECU (step S1110).

The control method according to an embodiment of the present disclosure may include generating, by the first ECU, if the first ECU operates normally, a second lock disable signal L_DIS2 for inactivating the second locking circuit LC2 included in the second ECU and transmitting the second lock disable signal L_DIS2 to the second ECU (step S1120).

In addition, the control method according to an embodiment of the present disclosure may include deactivating the second locking circuit LC2 included in the second ECU based on or in response to the second lock disable signal L_DIS2 (operation S1130).

As a result, even if the second ECU fails or is in an abnormal state, the second locking circuit LC2 included in the second ECU is deactivated so that the motor can be controlled by the first ECU in a normal state (step S1140).

In step S1120, the first ECU may generate a first gate driver enable signal G_EN1 for activating the first gate driver, and transmit the first gate driver enable signal G_EN1 to the first gate driver.

In addition, in step S1120, the first ECU may supply the first gate driver enable signal G_EN1 to the first gate driver, and simultaneously transmit the second lock disable signal L_DIS2 to the second ECU. In this case, the second lock disable signal L_DIS2 may be the same signal as the first gate driver enable signal G_EN1.

In this case, the second locking circuit may include a second-1 switching device connected to an output terminal or node of the second inverter and a second-2 switching device for turning on or off the second-1 switching device.

In step S1120, the second lock disable signal L_DIS2 may be supplied or transmitted to a second gate node of the second-2 switching device.

The second-1 switching device may include a first gate node connected to a high potential voltage, a first source node connected to the output terminal node of the second inverter, and a first drain node grounded.

In addition, the second-2 switching device may include a second source node connected to a first node between the high potential voltage and the first gate node of the second-1 switching device, a second drain node grounded, and the second gate node to which the second lock disable signal is applied.

In addition, a voltage regulation switch or an isolator may be further disposed on a transmission path of the second lock disable signal L_DIS2.

The voltage regulation switch may output a battery level voltage in response to a high level second lock disable signal.

The voltage regulation switch can prevent an erroneous recognition of the lock disable signal even when a reference voltage offset of the duplicated ECUs occurs.

The isolator may be, for example, but not limited to, an opto-coupler or a photo-coupler.

Since the isolator may transmit signals without a separate power source, the isolator can insulate between ECUs, while enabling the safe transmission of lock disable signals between the ECUs.

Figure 12:
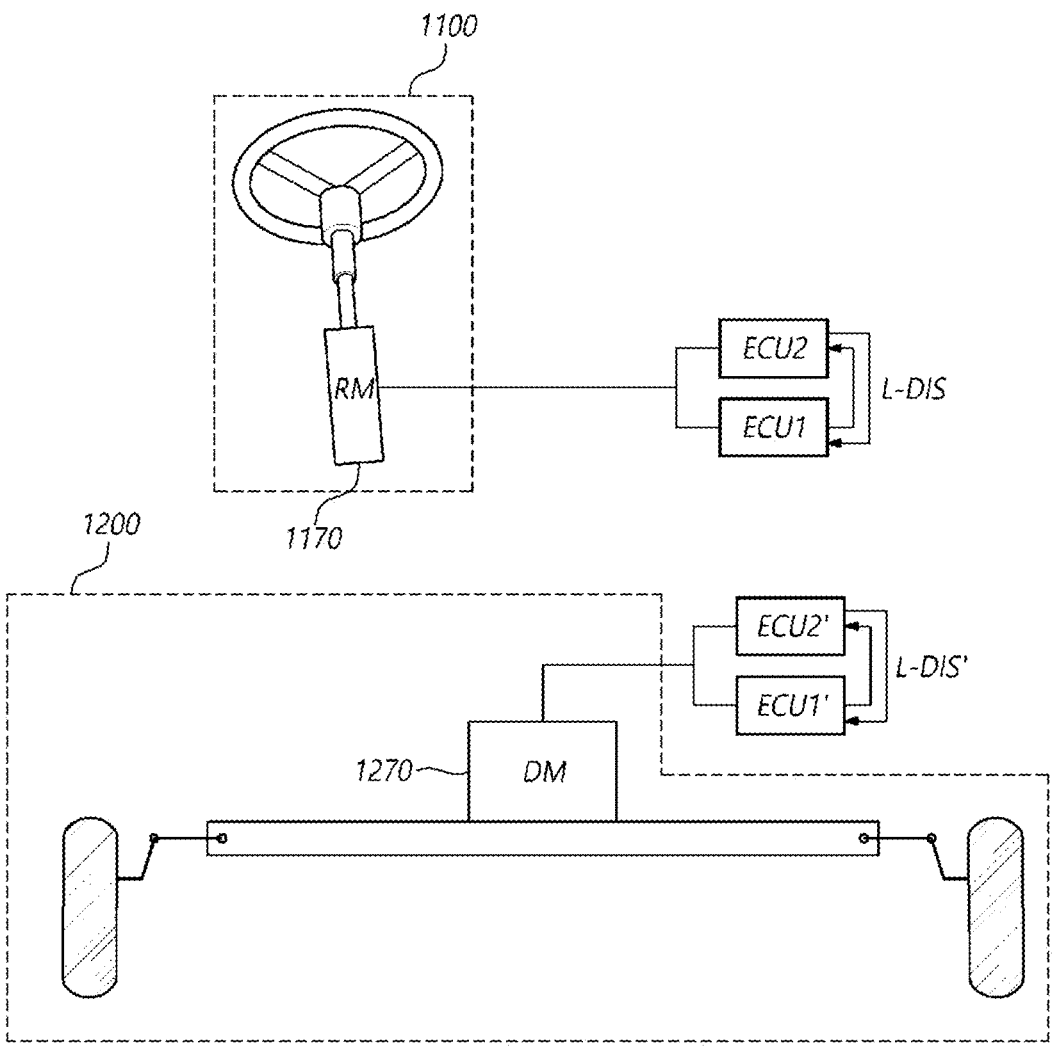
FIG. 12 illustrates a schematic configuration of a redundant SBW steering system according to an embodiment of the present disclosure.

FIG. 12 illustrates a schematic configuration of a redundant SBW steering system according to an embodiment of the present disclosure.

An electric power steering system according to an embodiment of the present disclosure may be a redundant SBW steering system.

A SBW steering system according to an embodiment of the present disclosure may include an upper device 1100 including a steering wheel and a reaction force motor (RM) 1170 operably connected or interlocked with the steering wheel, and a lower device 1200 which is mechanically separated from the upper device 1100 and includes a steering driving motor (DM) 1270 operably connected or interlocked with one or more vehicle wheels of a vehicle.

The configurations of the upper device 1100 and the lower device 1200 may correspond to or be similar with the configuration described in FIG. 2.

The SBW steering system according to an embodiment of the present disclosure may include a first steering controller ECU1 including a first inverter supplying driving current to the reaction force motor 1170 or the steering driving motor 1270, a first locking circuit LC1 connected to the first inverter, and a first gate driver controlling the driving of the first inverter, and a second steering controller ECU2 including a second inverter supplying driving current to the reaction force motor 1170 or the steering driving motor 1270, a second locking circuit LC2 connected to the second inverter, and a second gate driver controlling the driving of the second inverter. For example, if the first steering controller ECU1 operates normally, the first steering controller ECU1 may transmit a second lock disable signal L_DIS2 for inactivating the second locking circuit LC2, included in the second steering controller ECU2, to the second steering controller ECU2.

Alternatively or additionally, if the second steering controller ECU2 operates normally, the second steering controller ECU2 may transmit a first lock disable signal L_DIS1 for inactivating the first locking circuit LC1, included in the first steering controller ECU1, to the first steering controller ECU1.

As shown in the upper device 1100 of FIG. 12, the SBW steering system according to an embodiment of the present disclosure may include a first ECU (ECU1) and a second ECU (ECU2) as the redundant controllers to control a reaction force motor 1170. In this case, the normally operating ECU may transmit a lock disable signal L_DIS for inactivating a motor locking circuit, included in the other ECU, to the other ECU.

Therefore, even if only one of the two ECUs, ECU1 and ECU2, for the reaction force motor 1170 fails or is in an abnormal state, the reaction force motor 1170 is not restrained so that the reaction force motor 1170 can be controlled through the ECU which is in a normal state.

In addition, if both the ECU1 and ECU2 for the reaction force motor(s) 1170 are abnormal or fail or the vehicle ignition is turned off, the reaction force motor 1170 may be restrained, thereby preventing sudden steering of the steering wheel.

As another example, the SBW steering system according to an embodiment of the present disclosure may include a first ECU (ECU1') and a second ECU (ECU2') as the redundant controllers to control the steering driving motor 1270 included in the lower device 1200. For example, a normally operating ECU may transmit a lock disable signal L_DIS' for inactivating a motor locking circuit, included in the other ECU, to the other ECU.

Therefore, even if only one of two ECUs, ECU1' and ECU2', for the steering driving motor 1270 fails, the steering driving motor 1270 is not restrained so that the steering driving motor can be controlled by a remaining ECU which is in a normal state and perform the steering control through the ECU which is in a normal state.

In addition, if both ECUs, ECU1 and ECU2, for the steering driving motor 1270 are abnormal or fails or the vehicle ignition is turned off, the steering driving motor 1270 may be restrained, thereby securing the stability of the vehicle by preventing arbitrary steering of the vehicle wheel (s).

Of course, as shown in FIG. 12, the control device according to an embodiment of the present disclosure may be applied to both a steering controller for controlling the reaction force motor 1170 included in the upper device 1100 and a steering controller for controlling the steering driving motor 1270 included in the lower device 1200.

Each of the first locking circuit LC1 and the second locking circuit LC2 may include at least two switching devices (e.g. switches). The motor locking function of each of the first locking circuit LC1 and the second locking circuit LC2 may be disabled by a lock disable signal of the high level transmitted from other ECU or a driving voltage VDD supplied from the corresponding ECU.

Since the detailed circuit configuration of each of the first locking circuit LC1 and the second locking circuit LC2 is the same as that described in FIG. 5, a detailed description thereof will be omitted.

In addition, although not shown, the SBW steering system according to an embodiment of the present disclosure may further include a voltage regulation switch (e.g. 500 in FIG. 6) disposed on a transmission path of the second lock disable signal L_DIS2.

The voltage regulation switch may output a constant battery level voltage in response to a high level second lock disable signal L_DIS2.

The voltage regulation switch may prevent erroneous recognition of the lock disable signal even if a reference voltage offset occurs between redundant ECUs of the electric power steering system.

In addition, although not shown, the SBW steering system according to an embodiment of the present disclosure may further include an isolator (e.g. 600 in FIG. 7) disposed on a transmission path of the second lock disable signal L_DIS2.

For instance, the isolator 600 may be an opto-coupler including an optical transmission element which emits light in response to the second lock disable signal L_DIS2, and an optical receiver which is turned on by the light emitted by the optical transmission element and outputs a signal corresponding to the second lock disable signal.

Since the isolator transmit signals without a separate power source, the isolator transmit may function to insulate between ECUs, while enabling the safe transmission of lock disable signals between ECUs.

In addition, in the SBW steering system according to an embodiment of the present disclosure, each of the first ECUs (ECU1 and ECU1') may further include a first micro control unit (MCU) generating a first gate driver enable signal for activating the first gate driver and supplying the first gate driver enable signal to the first gate driver.

For example, if the first ECU is in a normal state, the first MCU may supply the first gate driver enable signal G_EN1 of a high level to the first gate driver, and simultaneously transmit the second lock disable signal L_DIS2, which is the same high level signal as the first gate driver enable signal G_EN1, to the second ECU (ECU2).

As described above, according to the control device of some embodiments of the present disclosure, if a failure or abnormality occurs in only one ECU in an electric power steering system having redundant ECUs, the lock of the motor can be prevented by disabling a motor locking circuit of the abnormal ECU by a normal steering ECU.

Therefore, even if a failure or an error occurs in one steering control circuit in a redundant electric steering system having two or more steering control circuits (ECUs), the motor locking circuit included in the abnormal steering control circuit can be deactivated in order to solve a problem in which the motor is locked and normal steering control is impossible.

In particular, a control device of a steering system according to certain embodiments of the present disclosure may be applied to an upper device and/or a lower device of the SBW steering system.

Therefore, even if only one of two redundant ECUs for the reaction force motor(s) or the steering driving motor fails, the motor may not be locked or restrained so that the motor can be continuously controlled by a normal ECU.

In addition, in the case that both or all of two redundant ECUs for the reaction force motor(s) or the steering driving motor fail or the vehicle ignition is turned off, a sudden steering of the steering wheel can be prevented by locking or restraining the reaction force motor, and an arbitrary steering of the vehicle wheel can be prevented by locking or restraining the steering driving motor.

It should be noted that although all or some of the configurations or elements included in one or more of the embodiments described above have been combined to constitute a single configuration or component or operated in combination, the present disclosure is not necessarily limited thereto. That is, within the scope of the object or spirit of the present disclosure, all or some of the configurations or elements included in the one or more of the embodiments may be combined to constitute one or more configurations or components or operated in such combined configuration (s) or component(s). Further, each of the configurations or elements included in one or more of the embodiments may be implemented by an independent hardware configuration; however, some or all of the configurations or elements may be selectively combined and implemented by one or more computer program(s) having one or more program module(s) that perform some or all functions from one or more combined hardware configuration(s). Codes or code segments constituting the computer program(s) may be easily produced by those skilled in the art. As the computer programs stored in computer-readable media are read and executed by a computer, embodiments of the present disclosure can be implemented. The media for storing computer programs may include, for example, a magnetic storing medium, an optical recording medium, and a carrier wave medium.

Further, unless otherwise specified herein, terms 'include', 'comprise', 'constitute', 'have', and the like described herein mean that one or more other configurations or elements may be further included in a corresponding configuration or element. Unless otherwise defined herein, all the terms used herein including technical and scientific terms have the same meaning as those understood by those skilled in the art. The terms generally used such as those defined in dictionaries should be construed as being the same as the meanings in the context of the related art and should not be construed as being ideal or excessively formal meanings, unless otherwise defined herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A device for controlling an electric power steering system, the device comprising:
    a first steering controller including a first inverter, a first locking circuit configured to selectively lock a motor and connected to the first inverter, and a first gate driver configured to control driving of the first inverter; and a second steering controller including a second inverter, a second locking circuit configured to selectively lock the motor and connected to the second inverter, and a second gate driver configured to control driving of the second inverter, wherein, the first steering controller is configured to, if the first steering controller operates normally, transmit a lock disable signal for inactivating the second locking circuit, included in the second steering controller, to the second steering controller.

2. The device of claim 1, wherein:

the second locking circuit includes a first switch connected to an output node of the second inverter and a second switch configured to turn on or off the first switch, and a second gate node of the second switch is configured to receive the lock disable signal from the first steering controller.

3. The device of claim 2, wherein the first switch includes a first gate node connected to a voltage source, a first source node connected to the output node of the second inverter, and a first drain node grounded.

4. The device of claim 3, wherein the second switch includes a second source node connected to a first node between the voltage source and the first gate node of the first switch, a second drain node grounded, and the second gate node configured to receive the lock disable signal.

5. The device of claim 1, further comprising a voltage regulation switch disposed on a transmission path of the lock disable signal.

6. The device of claim 5, wherein the voltage regulation switch is configured to output a battery level voltage in response to the lock disable signal.

7. The device of claim 1, further comprising an isolator disposed on a transmission path of the lock disable signal.

8. The device of claim 2, wherein the isolator comprises an opto-coupler including an optical transmitter configured to emit light in response to the lock disable signal, and an optical receiver configured to be turned on in response to the light emitted from the optical transmitter and output a signal corresponding to the lock disable signal.

9. The device of claim 1, wherein:

the first steering controller further includes a first micro control unit (MCU) configured to transmit one or more signals for activating the first gate driver and inactivating the second locking circuit to the first gate driver and/or the second steering controller, and the lock disable signal is included in the one or more signals transmitted from the first MCU.

10. The device of claim 1, wherein:

each of the first inverter and the second inverter includes an H-bridge circuit configured to supply u-phase driving current, v-phase driving current, and w-phase driving current to the motor, and the second locking device includes a second u-phase locking circuit connected to an u-phase driving current output terminal of the second inverter, a second v-phase locking circuit connected to a v-phase driving current output terminal of the second inverter, and a second w-phase locking circuit connected to a w-phase driving current output terminal of the second inverter.

11. The device of claim 10, wherein the lock disable signal is supplied to all of the second u-phase locking circuit, the second v-phase locking circuit, and the second w-phase locking circuit.

12. A method of controlling an electric power steering system, which includes a first steering controller including a first inverter, a first locking circuit configured to selectively lock a motor and connected to the first inverter, and a first gate driver configured to control driving of the first inverter, and a second steering controller including a second inverter, a second locking circuit configured to selectively lock the motor connected to the second inverter, and a second gate driver configured to control driving of the second inverter, the method comprising:

monitoring, by the first steering controller, an operating state of the first steering controller;

if the first steering controller operates normally, transmitting, by the first steering controller, a lock disable signal for inactivating the second locking circuit, included in the second steering controller, to the second steering controller; and deactivating the second locking circuit in response to the lock disable signal transmitted from the first steering controller.

13. The method of claim 12, further comprising providing, by the first steering controller, a first gate driver enable signal for activating the first gate driver to the first gate driver.

14. The method of claim 12, wherein:

the transmitting of the lock disable signal comprises transmitting, by the first steering controller, one or more signals for activating the first gate drive and inactivating the second locking circuit to the first gate driver and/or the second steering controller, and the lock disable signal is included in the one or more signals transmitted from the first steering controller.

15. The method of claim 12, wherein:

the second locking circuit comprises a first switch connected to an output node of the second inverter and a second switch configured to turn on or off the first switch, and the lock disable signal is supplied to a second gate node of the second switch.

16. The method of claim 12, wherein at least one of a voltage regulation switch and an isolator is disposed on a transmission path of the lock disable signal.

17. An electric power steering system comprising:

an upper device including a steering wheel and a reaction force motor operably connected with the steering wheel;

a lower device mechanically separated from the upper device, the lower device including a steering driving motor operably connected with at least one vehicle wheel;

a first steering controller including a first inverter supplying driving current to the reaction force motor or the steering driving motor, a first locking circuit configured to selectively lock a motor and connected to the first inverter, and a first gate driver configured to control driving of the first inverter; and a second steering controller including a second inverter supplying driving current to the reaction force motor or the steering driving motor, a second locking circuit configured to selectively lock the motor and connected to the second inverter, and a second gate driver configured to control driving of the second inverter, wherein, the first steering controller is configured to, if the first steering controller operates normally, transmit a lock disable signal for inactivating the second locking circuit, included in the second steering controller, to the second steering controller.

18. The electric power steering system of claim 17, wherein:

the second locking circuit includes a first switch connected to an output node of the second inverter and a second switch configured to turn on or off the first switch, and a second gate node of the second switch is configured to receive the lock disable signal from the first steering controller.

19. The electric power steering system of claim 18, wherein the first switch includes a first gate node connected to a voltage source, a first source node connected to the output node of the second inverter, and a first drain node grounded.

20. The electric power steering system of claim 19, wherein the second switch includes a second source node connected to a first node between the voltage source and the first gate node of the first switch, a second drain node grounded, and the second gate node configured to receive the lock disable signal.

21. The electric power steering system of claim 17, further comprising a voltage regulation switch disposed on a transmission path of the lock disable signal.

22. The electric power steering system of claim 21, wherein the voltage regulation switch is configured to output a battery level voltage in response to the lock disable signal.

23. The electric power steering system of claim 17, further comprising an isolator disposed on a transmission path of the lock disable signal.

24. The electric power steering system of claim 23, wherein the isolator comprises an opto-coupler including an optical transmitter configured to emit light in response to the lock disable signal, and an optical receiver configured to be turned on in response to the light emitted from the optical transmitter and output a signal corresponding to the lock disable signal.

25. The electric power steering system of claim 17, wherein:

the first steering controller further includes a first micro control unit (MCU) configured to transmit one or more signals for activating the first gate driver and inactivating the second locking circuit to the first gate driver and/or the second steering controller, and the lock disable signal is included in the one or more signals transmitted from the first MCU.

\* \* \* \* \*